Oct. 20, 1942.  G. S. TIFFANY  2,299,438
VIBRATORY RECTIFIER
Filed Aug. 2, 1940  2 Sheets-Sheet 1
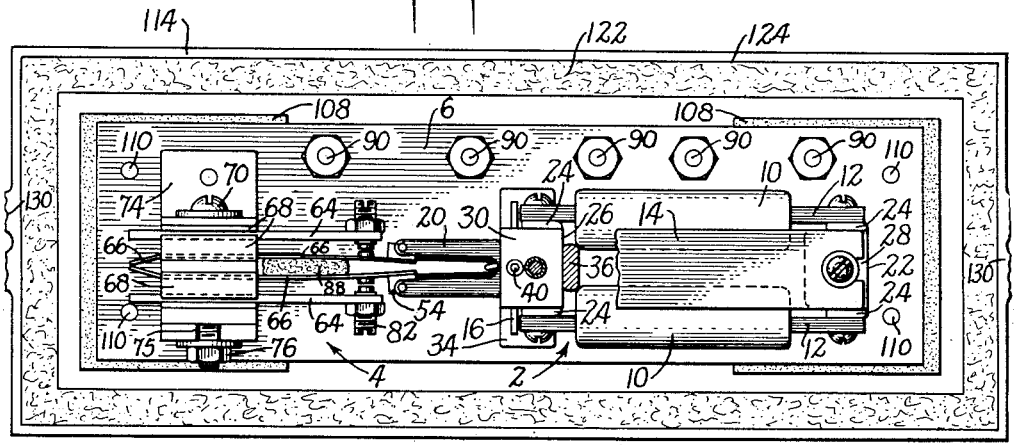
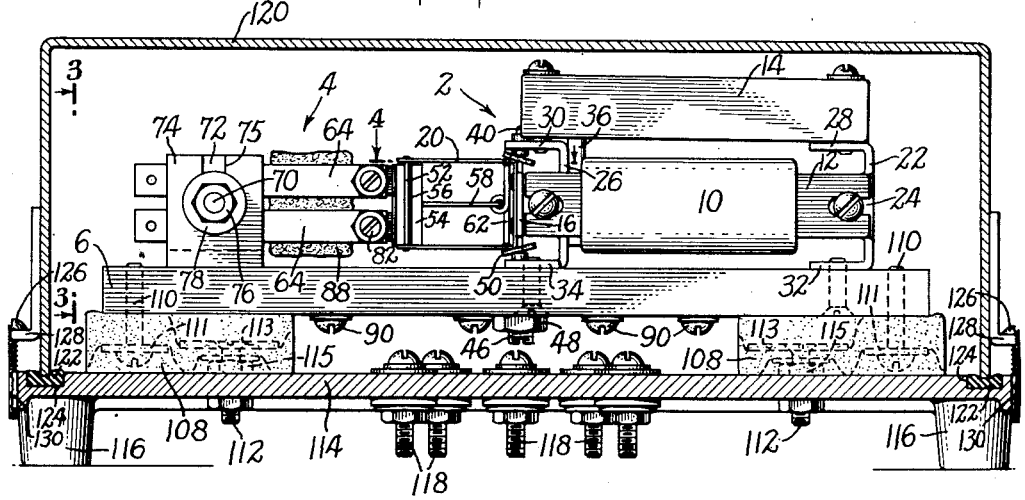
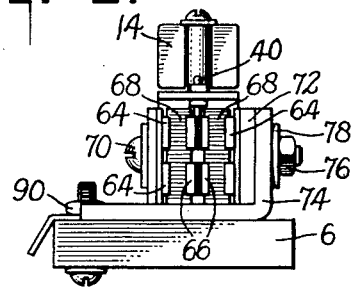
INVENTOR
George S. Tiffany
BY
Blair, Curtis & Hayward
ATTORNEYS Oct. 20, 1942.　　　　G. S. TIFFANY　　　　2,299,438
VIBRATORY RECTIFIER
Filed Aug. 2, 1940　　　　2 Sheets-Sheet 2
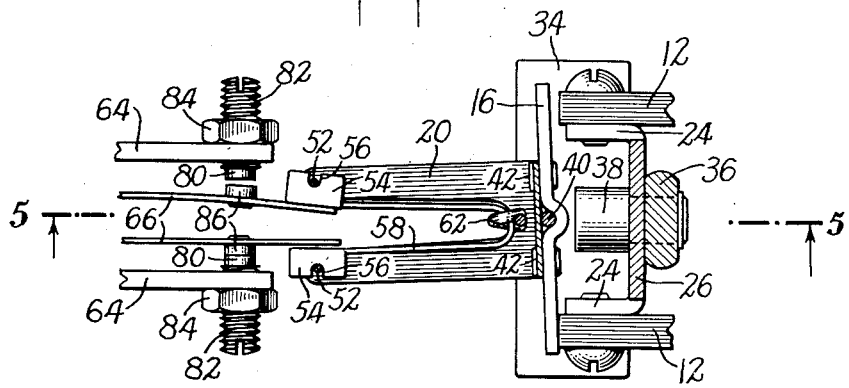
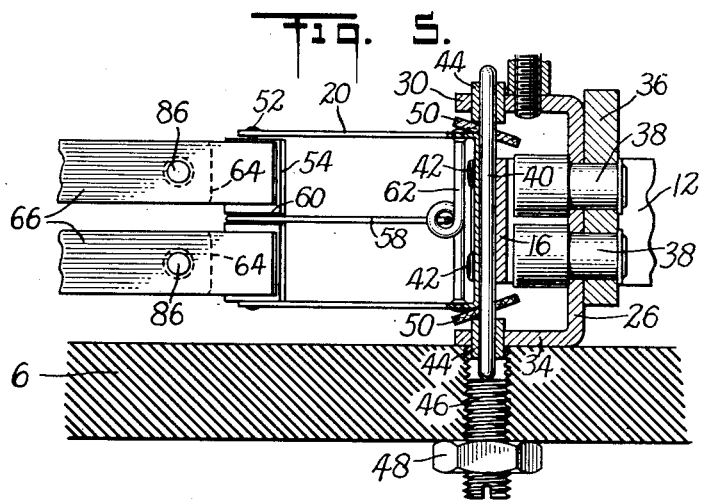
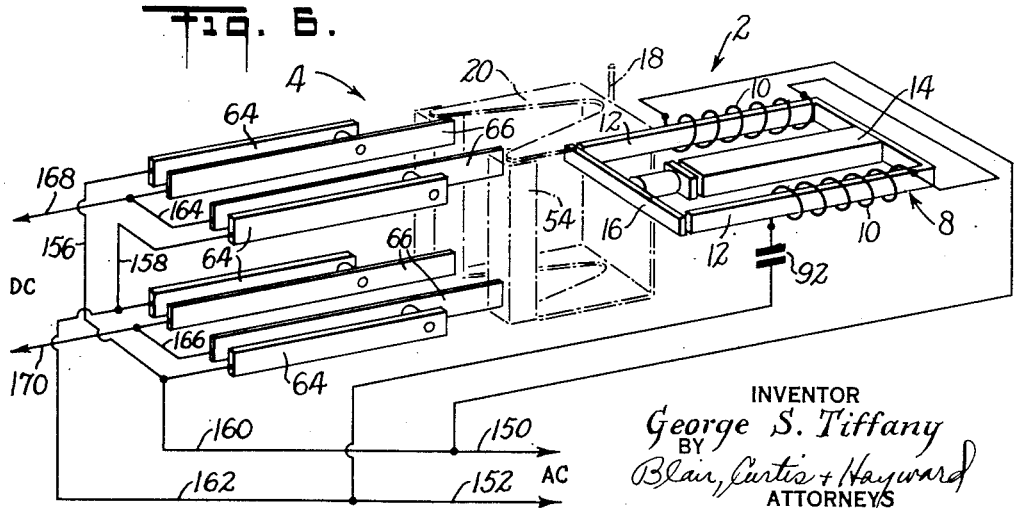
INVENTOR
George S. Tiffany
BY
Blair, Curtis + Hayward
ATTORNEYS Patented Oct. 20, 1942

2,299,438

UNITED STATES PATENT OFFICE 2,299,438

VIBRATORY RECTIFIER

George S. Tiffany, Summit, N. J., assignor to Telautograph Corporation, New York, N. Y., a corporation of Virginia Application August 2, 1940, Serial No. 349,475

14 Claims. (Cl. 200—90)

This invention relates to improvements in electric apparatus and more particularly to improvements in vibratory contact apparatus for use in electrical devices such as vibratory rectifiers and the like.

It is an object of this invention to provide a simple, rugged, and efficient electrical vibratory contact apparatus.

It is also an object of this invention to provide such apparatus which is not subject to the uneven wearing and pitting of contact points prevalent in existing structures, and further to provide apparatus in which precise control of the opening and closing of the contacts is obtained to permit a clean "make-and-break" so as to prevent parasitic contact action and thus improve the efficiency.

These and other apparent objects and advantages are obtained by the means described in the following specification, and may be more readily understood by reference to the accompanying drawings, in which:

Figure 1 shows a plan view, partially broken away and partly in section, of a mechanical vibrator-type rectifier unit embodying the invention;

Figure 2 shows a side elevation, partially in section, of the rectifier unit shown in Figure 1;

Figure 3 shows an end elevation of a portion of the rectifier unit, taken in the direction of arrows 3—3 in Figure 2;

Figure 4 is an enlarged sectional view of the central portion of the rectifier structure, taken on line 4—4 of Figure 2;

Figure 5 is a sectional view, taken on line 5—5 of Figure 4; and

Figure 6 is a diagrammatic perspective view of the rectifier unit of Figures 1 through 5, showing schematically suitable electrical connections for the apparatus.

Referring to Figures 1, 2, and 6, the mechanical vibrator-type rectifier embodying the invention herein described consists essentially of an electrical vibratory motor unit, generally indicated at 2, and a make-and-break contact structure, generally indicated at 4. In accordance with the typical operation of a mechanical vibrator-type rectifier, as illustrated, for example, in U. S. Patent No. 1,019,608, the contact structure 4 is adapted to be cyclically operated by the motor unit 2 in synchronism with the alternations of an A. C. power supply to convert the A. C. power to D. C. power. The terminals of this contact structure are connected to the A. C. power supply and to a D. C. load circuit and they are so interconnected that the circuit between the A. C. and D. C. systems is reversed every half cycle by reason of the synchronized drive from motor 2. Thus, the positive side of the A. C. line is always connected to the positive line of the D. C. load to provide a rectifying action. The motor unit 2 is rigidly secured to an insulating base 6, and the contact structure 4 is removably secured to the base 6 in fixed relation to the motor unit so that it may be readily replaced if necessary, as will be hereinafter described in greater detail.

The vibratory electrical motor unit 2, as is shown more simply in the schematic wiring diagram in Figure 6, comprises an effectively E-shaped magnetic structure, generally indicated at 8, having a pair of driving coils 10 wound around the upper and lower arms 12 of the E-shaped structure. A permanent magnet 14 forms the middle arm of the E, and an armature 16 closes its open side. Armature 16 is mounted to rock about a pivotal axis 18 opposite the end of the middle arm 14. The permanent magnet 14 thus provides a magnetic bias in the magnetic circuit which interacts with the magnetic force developed by the driving coils 10 to cause the upper and lower poles 12 of the U-shaped magnetic structure to alternately attract the ends of the armature 16 to rock it about the axis 18. When it is rocked in this manner, the ends of the armature alternately strike the arms 12 of the E-shaped magnet at a frequency determined by the frequency of the alternating current voltage impressed on the driving coils 10. Rigidly secured to armature 16 and perpendicular thereto is a member 20 which is the driving member of the vibratory motor structure 2 which operates the vibrating contact arrangement 4.

The specific details of this vibratory motor unit 2 are shown in Figures 1 and 2. The driving coils 10 are wound around two strips of magnetic metal 12. The right-hand end of each of these strips 12 is screwed to a tab 25 which is integral with and bent perpendicular to a cross-shaped bracket member 22 also made of magnetic material. The left-hand ends of these strips 12 are secured in a similar manner to corresponding tabs 24 of a second cross-shaped member 26 formed of non-magnetic material. The two strips 12 and the bracket member 22 form the upper and lower arms and the back, respectively, of the above-mentioned E-shaped magnetic structure. As shown in Figure 2, a bar-shaped permanent magnet 14 is secured in a similar manner to two corresponding tabs 28 and 30 on the tops of brackets 22 and 26, respectively. Tabs 32 and 34 on the bottoms of brackets 22 and 26, respectively, are used to secure the vibratory motor unit 2 to the base 6. To complete the middle arm of the E-shaped magnetic circuit 8, partially formed by the permanent magnet 14, a strip of magnetic material 36 is secured to the back of bracket 26, as may be more readily seen in the enlarged views in Figures 4 and 5, by two rivets 38 of magnetic material having enlarged heads which extend from the other side of the bracket 26 toward the armature 16.

Referring further to Figures 4 and 5, the armature 16, formed of a flat strip of magnetic material having a transverse groove running across one face thereof, is rigidly secured to a pivot shaft 40, lying in this groove, by four rivets 42 which also rigidly secure the contact-driving member 20 to the armature, substantially as shown. The pivot shaft 40 is journaled in two hard metal bushings 44 set in the ends of tabs 30 and 34 of bracket 26. The vertical position of this shaft 40, and thus of the armature 16, may be regulated by adjusting a set screw 46 threaded into the base 6 beneath the lower end of the shaft 40. A lock nut 48 is provided to lock set screw 46 in position. Two oil-soaked felt washers 50 are provided adjacent the bushings 44 to suitably lubricate the movement of the shaft 40 in its bearings.

The driving member 20 of the vibratory motor 2 is a U-shaped strip of flat metal with the base of the U secured to the armature 16 by the rivets 42, as shown in Figure 5, and with each arm of the U being formed into two parallel branches substantially as shown in Figures 1 and 4. The corresponding branches of the two arms of member 20 are attached together by pins 52. Two rectangularly-shaped blocks 54 of insulating material (see Figure 2), each having a longitudinal groove 56 along one of its faces, are pivoted about the pins 52, the pins lying in the grooves 56. Blocks 54 are held in position against pins 52 by a U-shaped wire spring 58 which is held in position by transverse grooves 60 across the faces of blocks 54 opposite the faces having grooves 56. The base of the U-shaped spring 58 extends through a loop in the middle of a cross member 62 and is thus held in position midway between the arms of the U-shaped driving member 20.

The vibrating contact structure 4 is best visualized by referring to the perspective view in Figure 6. It comprises two pairs of rigid contact arms 64 set in two parallel planes, and two pairs of leaf-spring type resilient contact arms 66 set in two other parallel planes between the planes of the rigid contact arms 64. The resilient contact arms 66 extend slightly beyond the ends of these rigid arms and between the driving blocks 54 mounted on the contact driving member 20. All of these contact members are held in these relative positions and separated from each other by a plurality of blocks 68 of insulation material, as shown in Figures 1, 2, and 3, and are clamped together by a screw 70 passing through an insulated sleeve and threaded into a large nut 72.

Referring to Figure 3, an L-shaped bracket 74 is attached to the base 6, and the entire vibrating contact structure 4 is detachably secured to the vertical portion of this L-shaped bracket by the screw 70 which slides into a vertical slot 75 in this arm of the bracket 74 and is secured thereto by another nut 76 and a lock washer 78.

Referring to the enlarged view in Figure 4, the rigid contact arms 64 are provided with contact points 80 attached to contact positioning screws 82 threaded into the ends of arms 64 and locked in proper position by lock nuts 84. The resilient contact members 66 carry suitable contact points 86 riveted thereto opposite the corresponding contacts 80.

The dimensions of the elements are so chosen and the various parts are so shaped and related that when the armature 16 is moved to one of its extreme positions one branch of the driving arm 20 through its associated pivoted driving block 54 moves the corresponding resilient spring contact members 66 sufficiently to move its associated contact 86 away from its corresponding fixed contact 80 to break the circuit therebetween. At the same time the other branch of the driving arm 20 moves its associated pivoted driving block 54 out of contact with its corresponding resilient contact support members 66 so as to permit the contacts 86 mounted thereon to firmly engage with their corresponding rigid contacts 80 on the other pair of rigid contact arms 64. When the armature 16 assumes its other extreme position, all of these elements move to their corresponding alternative positions which are just the reverse of those shown in Figure 4. This contact structure is so designed that the circuit between both pairs of contact points 80 and 86 in one set of contacts is broken before the circuit is made between the opposite corresponding pairs of contacts 80 and 86 in the other set. Referring to Figures 1 and 2, a pad of resilient material 88, for example felt saturated with oil, is wedged between the resilient contact supporting members 66 to damp vibrations.

The various contact members of the contact structure 4 are connected by wires (not shown) terminating in suitable lugs to a plurality of terminal screws 90 positioned along the one edge of the insulating base 6 and secured thereto by suitable nuts, as shown in Figures 1 and 2. When it becomes necessary to replace the contact structure 4, this can be readily accomplished by removing these nuts to disconnect the connecting wires and by loosening nut 76 on screw 70 of the contact structure so that it may be slipped out of the slot 75 on the vertical arm of the bracket 74. A new contact structure may then be easily slipped into place and secured by tightening nut 76. With this arrangement a worn out or defective contact unit can be speedily replaced.

The insulating base 6 is attached at both ends to pads 108 of resilient material, such as sponge rubber, by screws 110 (shown in broken lines) passing through washers 111 embedded in the resilient pads 108, and threaded into holes in four corners of the base 6. The resilient pads 108 are attached in a similar manner by screws 112, washers 113, and nuts 115 (shown in broken lines) to a metal frame or base plate 114. The base plate 114 has legs 116 on each corner thereof so that the rectifier can be suitably attached to the apparatus with which it is to be used. The metal base 114 also supports terminal screws 118 whereby the rectifier is connected to the circuit of such apparatus. The leads of the driving coils 10, and the leads from the above-mentioned contact terminal screws 90 are suitably interconnected under the insulating base 6, and the input and output circuits are connected to the terminals 118 mounted on the metal base plate 114. These terminal screws pass through the metal base 114 and are suitably insulated therefrom by insulating washers and sleeves.

A rectangularly-shaped metal shell or cover 120 is provided. It rests on a soft gasket 122 of felt or other suitable material positioned in a channel 124 running around the periphery of the upper face of the base 114. This metal cover 120 is suitably secured to the base 114 by screws 126 passing through tabs 128 attached to either end of the cover 120 and threaded into lugs 130 (all shown partially cut away) extending from either end of the base 114. The screws 126 may be tightened to force the cover 120 snugly against gasket 124 to render the entire enclosure gas tight, thus making it safe for operation in explosive atmospheres.

A suitable circuit is shown in Figure 6 for connecting up the above-described apparatus for use as a rectifier to convert A. C. to D. C. The driving coils 10 are connected in series with a phase shifting condenser 92 to the lines 150 and 152 of the A. C. power supply to form the energizing circuit for the vibratory motor unit 2. The rectifier power circuit is formed by connecting the diagonally opposite rigid contact support strip 64 together in two pairs by wires 156 and 158, which wires are then connected to the lines 150 and 152 of the A. C. power supply by wires 160 and 162, respectively. The adjacent resilient contact support arms 66 are connected together in two pairs by wires 164 and 166, and each pair connected to one of the lines 168 and 170, respectively, of the D. C. load to be energized. When these interconnections are made, as shown in Figure 6, the contact structure 4 effectively becomes a double-pole double-throw reversing switch with the center contacts of the switch connected to the D. C. load and the diagonally connected outside contacts connected to the A. C. power supply. Thus, when the vibratory motor unit 2 drives the contact structure 4 cyclically, in synchronism with the alternations of the A. C. supply, one side of the A. C. power supply is connected to one side of the D. C. load circuit during one-half of the A. C. cycle and then to the other side of the D. C. load circuit for the succeeding half-cycle thus effectively rectifying the A. C. power to supply it in the form of pulsating D. C. to the load. This reversal of connections occurs each half-cycle in synchronism with the alternations of the A. C. supply. The capacity of condenser 92 is chosen so as to adjust the phase of the current through the driving coil 10 to properly synchronize the motion of armature 16 and driving arm 20 with the alternation of the A. C. power supply, so that the proper contacts are made and broken when the A. C. voltage is approximately at zero value. This minimizes the sparking between the contacts 80 and 86 and thus reduces pitting of the contacts and generation of transient surges in the circuits.

As many possible embodiments of the present invention may be made without departing from the scope thereof, it is to be understood that all matter herein set forth or shown in the accompanying drawings is to be interpreted as illustrative only and not in a limiting sense.

I claim:

1. In vibratory electrical contact apparatus of the character described, the combination of, two switch units, each of said units including a fixed contact and a movable contact and biasing means normally holding the movable contact into engagement with the fixed contact, a switch-actuating member operably connected to said switch units and freely mounted to rock between two extreme positions to alternately actuate said units, said switch-actuating member being normally urged by said switch unit biasing means to a mid-position and being movable to one extreme position in which it is totally disengaged from one of said switch units and has moved the movable contact of the other switch unit out of engagement with its fixed contact thereby loading its biasing means and to another extreme position in which a corresponding condition exists when said other switch unit is closed and said one switch unit is open with its biasing means loaded, and oscillatable motor means cyclically rocking said switch-actuating member alternately to said extreme positions, the operating relationship being such that when said switch-actuating member reaches one extreme position the reversal in its direction of movement is facilitated by the action of the biasing means of the open-circuited switch unit and the open-circuiting of the other switch unit takes place after said switch-actuating memebr has attained appreciable speed of movement which speed of movement is a result of the combined action of the biasing means and the motor means initiating the rocking movement.

2. In vibratory electrical contact apparatus of the character described, the combination of, two switch units, each of said units including a fixed contact and a movable contact and biasing means normally holding the movable contact into engagement with the fixed contact, switch-opening armature means operably connected to said switch units and freely mounted to rock between two extreme positions to alternately open said switch units, said armature means being normally urged by said switch unit biasing means to a mid-position in which both of said switches are open, magnetic means energized to alternately attract and repel said armature means to cyclically rock it to one extreme position in which it is totally disengaged from one of said switch units and has moved the movable contact of the other switch unit out of engagement with its fixed contact thereby loading its biasing means and to another extreme position in which a corresponding condition exists with said other switch means closed and said one switch open with its biasing means loaded, the operating relationship being such that when said armature means reaches one extreme position the reversal in its direction of movement in its rocking motion caused by reversal of the action of said magnetic means is facilitated by the action of the biasing means of the then open-circuited switch unit and the open-circuiting of the other switch unit takes place after said armature means has attained appreciable speed of movement which speed of movement is a result of the combined action of the biasing means and the magnetic means.

3. In vibratory electrical contact apparatus of the character described, the combination of a freely rockably mounted driven member, cyclically operable vibratory motor means to rock said driven member, a first fixed contact, a second fixed contact, a third contact movably mounted opposite said first contact, first bias means normally biasing said third contact into engagement with said first contact, a fourth contact movably mounted opposite said second contact, second bias means normally biasing said fourth contact into engagement with said second contact, and contact-opening means operably associated with said third and fourth contacts and rigidly secured to said driven member to be rocked thereby to alternate extreme positions into and out of mechanical connection with said third and fourth contacts, said biasing means jointly urging said contact-opening means to a mid-position, said driven member moving said contact-opening means to one extreme position in which said third contact is moved against the force of said first biasing means away from the first contact while simultaneously said fourth contact is released to permit it to engage said second contact under the force of said second biasing means and to another extreme position in which said fourth contact is moved away from said second contact and said third contact is released to engage said first contact whereby on each alternation of said contact-opening means the biasing means of the disengaged movable contact aids said motor means in moving said contact-opening means to its alternative extreme position during its initial movement thereto.

4. In vibratory electrical contact apparatus of the character described, the combination of a freely rockably mounted driven member, cyclically operable vibratory motor means to rock said driven member, a first fixed contact, a second fixed contact, a third contact movably mounted opposite said first contact, first bias means normally biasing said third contact into engagement with said first contact, a fourth contact movably mounted opposite said second contact, second bias means normally biasing said fourth contact into engagement with said second contact, vibration damping means associated with said third and fourth contacts, and contact-actuating means operably associated with said third and fourth contacts and rigidly secured to said driven member to be rocked thereby to alternate extreme positions into and out of mechanical connection with said third and fourth contacts, said biasing means jointly urging said contact-actuating means to a mid-position, said driven member moving said contact-actuating means to one extreme position in which said third contact is moved against the force of said first biasing means away from the first contact while simultaneously said fourth contact is released to permit it to engage said second contact under the force of said second biasing means and to another extreme position in which said fourth contact is moved away from said second contact and said third contact is released to engage said first contact whereby on each alternation of said contact-actuating means the biasing means of the disengaged movable contact aids said motor means in moving said actuating means to its alternative extreme position during its initial movement thereto.

5. In vibratory electrical contact apparatus of the character described, the combination of a freely rockably mounted armature, magnetic means positioned adjacent said armature, electrical means for cyclically magnetizing said magnetic means to alternately attract and repel said armature to impart a cyclical rocking motion thereto, a first fixed contact, a second fixed contact, a third contact movably mounted opposite said first contact, first bias means normally biasing said third contact into engagement with said first contact, a fourth contact movably mounted opposite said second contact, second bias means normally biasing said fourth contact into engagement with said second contact, and contact-actuating means operably associated with said third and fourth contacts and rigidly secured to said armature to be rocked thereby to alternate extreme positions into and out of mechanical connection with said third and fourth contacts, said biasing means jointly urging said contact-actuating means to a mid-position, said armature moving said contact-actuating means to one extreme position in which said third contact is moved against the force of said first biasing means away from the first contact while simultaneously said fourth contact is released to permit it to engage said second contact under the force of said second biasing means and to another extreme position in which said fourth contact is moved away from said second contact and said third contact is released to engage said first contact whereby on each alternation of said contact-actuating means the biasing means of the disengaged movable contact aids said magnetic means in moving said actuating means to its alternative extreme position during its initial movement thereto when the attraction force of said magnetic means is at a minimum.

6. In vibratory electrical contact apparatus of the character described, the combination of a driven member movably mounted to rock freely about an axis, cyclically operable vibratory motor means for rocking said driven member about said axis, a fork-shaped member rigidly secured to said driven member so the span of said fork is perpendicular to said axis to be rocked thereabout by said driving member, a pair of stationary contacts oppositely positioned with respect to said forked member, a pair of movable arms extending between said stationary contacts and having their free ends positioned between the prongs of said forked member, a movable contact mounted on each of said movable arms opposite to and adapted to coact with one of said stationary contacts, and means normally biasing said movable arms toward positions in which each of said movable contacts engages its respective stationary contact, the span between the prongs of said forked member being just sufficient to hold both of said movable contacts out of engagement with their associated stationary contacts during the middle portion of the rocking motion of said driven member, said biasing means normally urging said driven member to its mid-position, the extent of motion of said driven member being sufficient to move said forked member to an extreme position where one prong thereof holds one of said movable contacts out of engagement with its associated fixed contact while the other prong thereof is physically disconnected from said other movable contact to release the latter to engage its associated fixed contact under the action of said biasing means whereby the biasing means associated with the open contact aids said motor means in moving said driven member to its alternate extreme position during the initial portion of its movement thereto.

7. In vibratory electrical contact apparatus of the character described, the combination of a driven member movably mounted to rock freely about an axis, cyclically operable vibratory motor means for rocking said driven member about said axis, a fork-shaped member rigidly secured to said driven member so the span of said fork is perpendicular to said axis to be rocked thereabout by said driven member, a pair of stationary contacts oppositely positioned with respect to said forked member, a pair of movable arms extending between said stationary contacts and having their free ends positioned between the prongs of said forked member, vibration damping means associated with said movable arms, a movable contact mounted on each of said movable arms opposite to and adapted to coact with one of said stationary contacts, and means normally biasing said movable arms toward positions in which each of said movable contacts engages its respective stationary contact, the span between the prongs of said forked member being just sufficient to hold both of said movable contacts out of engagement with their associated stationary contacts during the middle portion of the rocking motion of said driven member, said biasing means normally urging said driven member to its mid-position, the extent of motion of said driven member being sufficient to move said forked member to an extreme position where one prong thereof holds one of said movable contacts out of engagement with its associated fixed contact while the other prong thereof is physically disconnected from said other movable contact to release the latter to engage its associated fixed contact under the action of said biasing means whereby the biasing means associated with the open contact aids said motor means in moving said driven member to its alternate extreme position during the initial portion of its movement thereto.

8. In vibratory electrical contact apparatus of the character described, the combination of a driven member movably mounted to rock freely about an axis, cyclically operable vibratory motor means for rocking said driven member about said axis, a fork-shaped member rigidly secured to said driven member so the span of said fork is perpendicular to said axis to be rocked thereabout by said driven member, a pair of stationary contacts oppositely positioned with respect to said forked member, a pair of leaf springs extending between said stationary contacts with their free ends positioned between the prongs of said forked member, and a contact mounted on each of said leaf springs opposite to and adapted to coact with one of said stationary contacts, each of said leaf springs being flexed to normally press the contact mounted thereon toward its corresponding stationary contact, the span between the prongs of said forked member being just sufficient to hold both of said leaf spring contacts out of engagement with their associated stationary contacts during the middle portion of the rocking motion of said driven member, said leaf springs normally urging said driven member to its mid-position, the extent of motion of said driven member being sufficient to move said forked member to alternate extreme positions where one prong thereof holds one of said leaf spring contacts out of engagement with its associated fixed contact while the other prong thereof is physically disconnected from said other leaf spring to release the latter to permit the contact mounted thereon to engage its associated fixed contact under the action of said leaf spring whereby the leaf spring associated with the open contact aids said motor means in moving said driven memer to its alternate extreme position during the initial portion of its movement thereto.

9. In vibratory electrical contact apparatus of the character described, the combination of a driven member movably mounted to rock freely about an axis, cyclically operable vibratory motor means for rocking said driven memer about said axis, a fork-shaped member rigidly secured to said driven member so the span of said fork is perpendicular to said axis to be rocked thereabout by said driven member, a pair of stationary contacts oppositely positioned with respect to said forked member, a pair of leaf springs extending between said stationary contacts with their free ends positioned between the prongs of said forked member, a pad of vibration damping material interposed between said leaf springs, and a contact mounted on each of said leaf springs opposite to and adapted to coact with one of said stationary contacts, each of said leaf springs being flexed to normally press the contact mounted thereon toward its corresponding stationary contact, the span between the prongs of said forked member being just sufficient to hold both of said leaf spring contacts out of engagement with their associated stationary contacts during the middle portion of the rocking motion of said driven member, said leaf springs normally urging said driven member to its mid-position, the extent of motion of said driven member being sufficient to move said forked member to alternate extreme positions where one prong thereof holds one of said leaf spring contacts out of engagement with its associated fixed contact while the other prong thereof is physically disconnected from said other leaf spring to release the latter to permit the contact mounted thereon to engage its associated fixed contact under the action of said leaf spring whereby the leaf spring associated with the open contact aids said motor means in moving said driven member to its alternate extreme position during the initial portion of its movement thereto.

10. In vibratory electrical contact apparatus of the character described, the combination of a driven member movably mounted to rock freely about an axis, cyclically operably vibratory motor means for rocking said driven member about said axis, a fork-shaped member rigidly secured to said driven member so the span of said fork is perpendicular to said axis to be rocked thereabout by said driven member, a pair of stationary contacts oppositely positioned with respect to said forked member, a pair of leaf springs extending between said stationary contacts with their free ends positioned between the prongs of said forked member, a pin mounted on each prong of said forked member parallel to said rocking axis, a block interposed between each pin and its corresponding leaf spring and adapted to pivot about the pin to always present a flat surface to the associated leaf spring, and a contact mounted on each of said leaf springs opposite to and adapted to coact with one of said stationary contacts, each of said leaf springs being flexed to normally press the contact mounted thereon toward its corresponding stationary contact, the span between the flat surfaces of the pivoted blocks on the prongs of said forked member being just sufficient to hold both of said leaf spring contacts out of engagement with their associated stationary contacts during the middle portions of the rocking motion of said driven member, said leaf springs normally urging said driven member to its mid-position, the extent of motion of said driven member being sufficient to move said forked member to alternate extreme positions where one prong thereof holds one of said leaf spring contacts out of engagement with its associated fixed contact while the other prong thereof is physically disconnected from said other leaf spring to release the latter to permit the contact mounted thereon to engage its associated fixed contact under the action of said leaf spring, whereby the leaf spring associated with the open contact aids said motor means in moving said driven member to its alternate extreme position during the initial portion of its movement thereto.

11. In vibratory electrical contact apparatus of the character described, the combination of a driven member movably mounted to rock freely about an axis, cyclically operable vibratory motor means for rocking said driven member about said axis, a fork-shaped member rigidly secured to said driven member so the span of said fork is perpendicular to said axis to be rocked thereabout by said driven member, a pair of stationary contacts oppositely positioned with respect to said forked member, a pair of leaf springs extending between said stationary contacts with their free ends positioned between the prongs of said forked member, a pin mounted on each prong of said forked member parallel to said rocking axis, a rectangular block having a longitudinal slot in one face thereof interposed between each pin and its corresponding leaf spring so that the pin lies in said slot to permit the block to pivot about the pin to always present a flat surface to the associated leaf spring, resilient means urging said blocks against said pins, and a contact mounted on each of said leaf springs opposite to and adapted to coact with one of said stationary contacts, each of said leaf springs being flexed to normally press the contact mounted thereon toward its corresponding stationary contact, the span between the flat surfaces of the pivoted blocks on the prongs of said forked member being just sufficient to hold both of said leaf spring contacts out of engagement with their associated stationary contacts during the middle portion of the rocking motion of said driven member, said leaf springs normally urging said driven member to its mid-position, the extent of motion of said driven member being sufficient to move said forked member to alternate extreme positions where one prong thereof holds one of said leaf spring contacts out of engagement with its associated fixed contact while the other prong thereof is physically disconnected from said other leaf spring to release the latter to permit the contact mounted thereon to engage its associated fixed contact under the action of said leaf spring, whereby the leaf spring associated with the open contact aids said motor means in moving said driven member to its alternate extreme position during the initial portion of its movement thereto.

12. In vibratory electrical contact apparatus of the character described, the combination of a driven member movably mounted to rock freely about an axis, cyclically operable vibratory motor means for rocking said driven member about said axis, a fork-shaped member rigidly secured to said driven member so the span of said fork is perpendicular to said axis to be rocked thereabout by said driven member, a pair of stationary contacts oppositely positioned with respect to said forked member, a pair of leaf springs extending between said stationary contacts with their free ends positioned between the prongs of said forked member, a pin mounted on each prong of said forked member parallel to said rocking axis, a rectangular block having a longitudinal slot in one face thereof interposed between each pin and its corresponding leaf spring so that the pin lies in said slot to permit the block to pivot about the pin to always present a flat surface to the associated leaf spring, said pivoted blocks having transverse slots in their faces opposite their longitudinally slotted faces, a U-shaped spring compressed to a position in which its arms rest in said transverse slots to urge said blocks against said pins, and a contact mounted on each of aid leaf springs opposite to and adapted to coact with one of said stationary contacts, each of said leaf springs being flexed to normally press the contact mounted thereon toward its corresponding stationary contact, the span between the flat surfaces of the pivoted blocks on the prongs of said forked member being just sufficient to hold both of said leaf spring contacts out of engagement with their associated stationary contacts during the middle portion of the rocking motion of said driven member, said leaf springs normally urging said driven member to its mid-position, the extent of motion of said driven member being sufficient to move said forked member to alternate extreme positions where one prong thereof holds one of said leaf spring contacts out of engagement with its associated fixed contact while the other prong thereof is physically disconnected from said other leaf spring to release the latter to permit the contact mounted thereon to engage its associated fixed contact under the action of said leaf spring, whereby the leaf spring associated with the open contact aids said motor means in moving said driven member to its alternate extreme position during the initial portion of its movement thereto.

13. In vibratory electrical contact apparatus of the character described, the combination of an armature movably mounted to rock freely about an axis intermediate its ends, a magnetizable pole piece positioned adjacent each end of said armature, electrical means for cyclically magnetizing said pole pieces to oppositely and alternately attract and repel said armature to rock it about said axis, a fork-shaped member rigidly secured to said armature so the span of said fork is perpendicular to said axis to be rocked thereabout by said armature, a pair of stationary contacts oppositely positioned with respect to said forked member, a pair of movable arms extending between said stationary contacts and having their free ends positioned between the prongs of said forked member, a movable contact mounted on each of said movable arms opposite to and adapted to coact with one of said stationary contacts, and means normally biasing said movable arms toward positions in which each of said movable contacts engages its respective stationary contact, the span between the prongs of said forked member being just sufficient to hold both of said movable contacts out of engagement with their associated stationary contacts during the middle portion of the rocking motion of said armature, said biasing means normally urging said armature to said mid-position, said pole pieces being spaced with respect to the ends of said armature so that the extent of its motion is sufficient to move said forked member to an extreme position where one prong thereof holds one of said movable contacts out of engagement with its associated fixed contact while the other prong thereof is physically disconnected from said other movable contact to release the latter to engage its associated fixed contact under the action of said biasing means, whereby the biasing means associated with the open contact aids the pull of the attracting pole piece in moving said armature to its alternate extreme position during the initial portion of its movement thereto when the attraction of said pole piece is at a minimum.

14. Vibratory contact apparatus of the character described, comprising, in combination, cyclically operated vibratory motor means, relatively movable contact means, freely movable mechanical means connecting said motor means to said contact means to move them relatively during a predetermined portion of the operating cycle of said motor means and to physically disconnect said motor means from said contact means during another predetermined portion of said operating cycle, and damping means operatively associated with said contact means only to damp the vibrations imparted thereto by said vibratory motor means whereby the motion of said motor means is not detrimentally affected by operation of said damping means.

GEORGE S. TIFFANY.